(12) United States Patent
Sakthikumar et al.

(10) Patent No.: US 9,075,751 B2
(45) Date of Patent: Jul. 7, 2015

(54) SECURE DATA PROTECTION WITH IMPROVED READ-ONLY MEMORY LOCKING DURING SYSTEM PRE-BOOT

(75) Inventors: Palsamy Sakthikumar, Puyallup, WA (US); Vincent J. Zimmer, Federal Way, WA (US); Robert C. Swanson, Olympia, WA (US); Eswaramoorthi Nallusamy, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 13/570,315

(22) Filed: Aug. 9, 2012

(65) Prior Publication Data

US 2014/0047174 A1 Feb. 13, 2014

(51) Int. Cl.
*G06F 12/00* (2006.01)
*G06F 13/00* (2006.01)
*G06F 12/14* (2006.01)

(52) U.S. Cl.
CPC ........ *G06F 12/1416* (2013.01); *G06F 12/1425* (2013.01)

(58) Field of Classification Search
CPC ... G06F 12/0646; G06F 12/00; G06F 9/4401; G06F 9/4411
USPC .................................. 711/163; 713/1, 2, 193
See application file for complete search history.

(56) References Cited

U.S. PATENT DOCUMENTS

| | | | | |
|---|---|---|---|---|
| 5,991,197 A * | 11/1999 | Ogura et al. | ............. | 365/185.11 |
| 6,292,874 B1 * | 9/2001 | Barnett | ......... | 711/153 |
| 2004/0049645 A1 * | 3/2004 | Lee et al. | ...... | 711/163 |
| 2004/0177261 A1 * | 9/2004 | Watt et al. | ...... | 713/193 |
| 2004/0268084 A1 | 12/2004 | Longerbeam et al. | | |
| 2007/0220276 A1 * | 9/2007 | Croxford et al. | .............. | 713/193 |
| 2008/0077973 A1 | 3/2008 | Zimmer et al. | | |
| 2008/0263256 A1 * | 10/2008 | Gudeth et al. | .................... | 711/2 |
| 2009/0172411 A1 * | 7/2009 | Kershaw et al. | .............. | 713/189 |
| 2010/0262823 A1 | 10/2010 | Wilson et al. | | |
| 2012/0036308 A1 * | 2/2012 | Swanson et al. | ................. | 711/1 |
| 2012/0159041 A1 | 6/2012 | Saxena et al. | | |

OTHER PUBLICATIONS

Intel Xeon Processor 7500 Series Datasheet, vol. 2, Mar. 2010.*
Heasman, Implementing and Detecting a PCI Rootkit:, Black Hat DC 2007, 15 pages.
Heasman, Implementing and Detecting an ACPI BIOS Rootkit, NGS Consulting 36 pages.

(Continued)

*Primary Examiner* — Aimee Li
*Assistant Examiner* — Edmund Kwong
(74) *Attorney, Agent, or Firm* — Grossman, Tucker, Perreault & Pfleger, PLLC (57) ABSTRACT

Generally, this disclosure provides methods and systems for secure data protection with improved read-only memory locking during system pre-boot including protection of Advanced Configuration and Power Interface (ACPI) tables. The methods may include selecting a region of system memory to be protected, the selection occurring in response to a system reset state and performed by a trusted control block (TCB) comprising a trusted basic input/output system (BIOS); programming an address decoder circuit to configure the selected region as read-write; moving data to be secured to the selected region; programming the address decoder circuit to configure the selected region as read-only; and locking the read-only configuration in the address decoder circuit.

20 Claims, 5 Drawing Sheets

(56) References Cited

OTHER PUBLICATIONS

International Search Report with Written Opinion received for PCT Application No. PCT/US2013/054113, mailed on Nov. 27, 2013, 13 pages.

International Preliminary Report on Patentability and Written Opinion received for PCT Patent Application No. PCT/US2013/054113, mailed on Feb. 19, 2015, 10 pages.

* cited by examiner

SECURE DATA PROTECTION WITH IMPROVED READ-ONLY MEMORY LOCKING DURING SYSTEM PRE-BOOT

FIELD

The present disclosure relates to secure data protection, and more particularly, to secure data protection with improved read-only memory locking during system pre-boot including protection of Advanced Configuration and Power Interface (ACPI) tables.

BACKGROUND

As computer platforms become more complex, software, including basic input/output system (BIOS) and BIOS to operating system (OS) communication routines are being increasingly targeted for attacks. These attacks can target Advanced Configuration and Power Interface (ACPI) tables, Unified Extensible Firmware Interface (UEFI) runtime services and other sensitive data. Current computing systems typically do not provide protection for system memory, where this sensitive code and data may reside, prior to completion of system boot up and/or OS loading. Since ACPI code may run in kernel mode after the OS begins execution, malicious modifications to the ACPI can create significant security vulnerabilities and may enable piracy of Original Equipment Manufacturer (OEM) OS images.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides methods and systems for secure data protection with improved read-only memory locking during system pre-boot including protection of Advanced Configuration and Power Interface (ACPI) tables. At power on or system reset, trusted software and/or hardware may select a region of system memory for protection. The trusted hardware may be a trusted control block (TCB) and the trusted software may be a trusted BIOS. An address decoder circuit may be programmed to configure the selected region as read-write so that sensitive data, to be secured, may be moved into the selected region of system memory. After moving the data, the address decoder circuit may be re-programmed to configure the selected region as read-only. The address decoder circuit may then be locked to prevent a subsequent change in status of the selected memory region unless the system is reset. The locking may thus prevent non-trusted code, including further pre-boot and boot operations as well as the OS from accidentally or maliciously altering the protected region of system memory.

Figure 1:
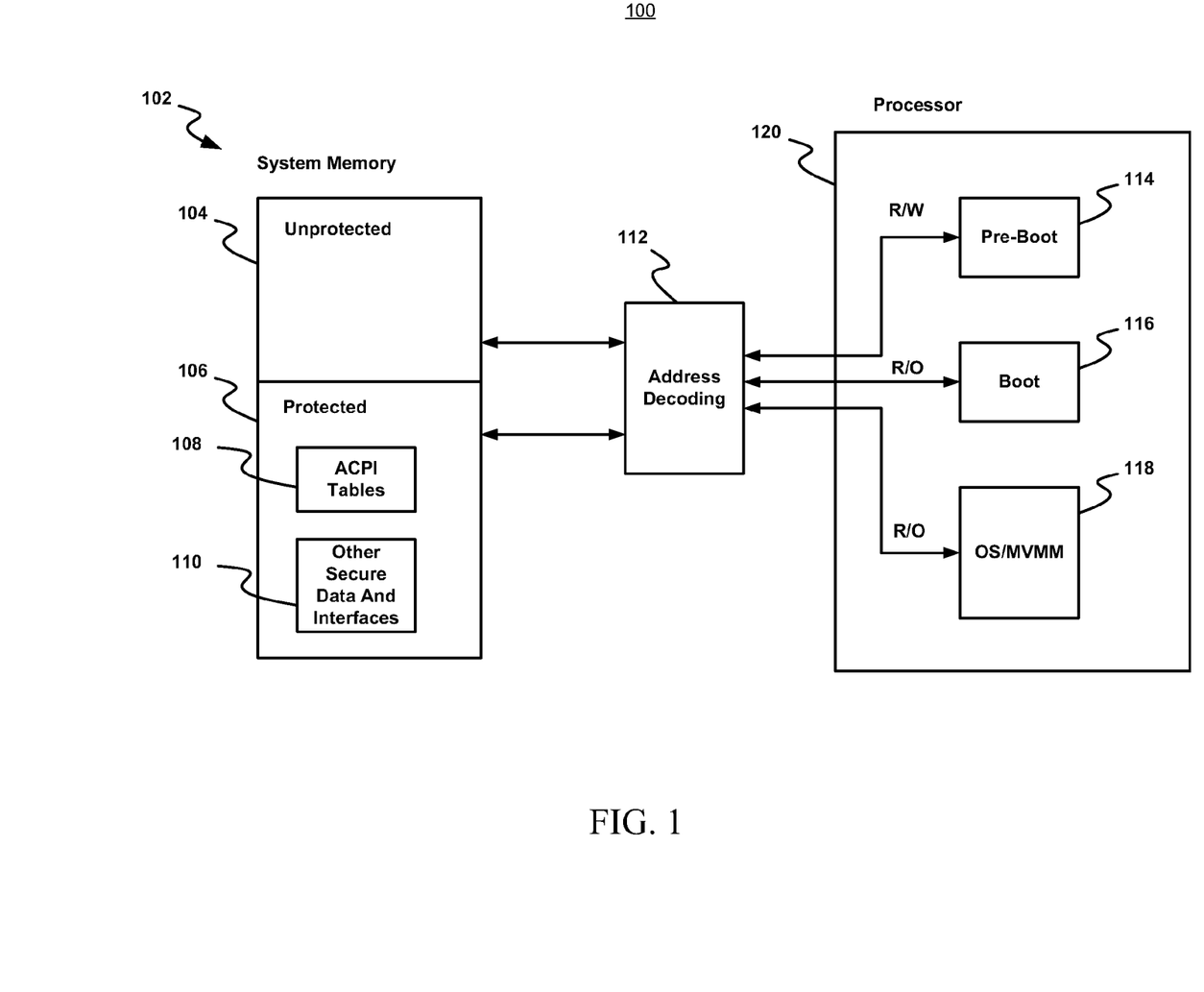
FIG. 1 illustrates a top level system diagram of one exemplary embodiment consistent with the present disclosure.

FIG. 1 illustrates a top level system diagram 100 of one exemplary embodiment consistent with the present disclosure. The system may comprise system memory 102, address decoding circuit 112 and a processor 120 configured to perform pre-boot operations 114, boot operations 116 and OS operations 118. The system memory may be segmented into an unprotected region 104 and a protected region 106 through configuration of the address decoding circuit 112 as will be described in greater detail below. The protected region of memory 106 may be loaded with ACPI tables 108 and other sensitive data to be secured 110 during pre-boot operations 114 by trusted BIOS code. In some embodiments, the other sensitive data 110 may include Unified Extensible Firmware Interface (UEFI) runtime services. The protected region of memory 106 may be then locked into read-only mode prior to a transfer of control to non-trusted code, for example in the boot 116 and OS 118. In some embodiments, the OS operations may include Measured Virtual Machine Monitors (MVMM) and applications to be executed with the support of the OS.

Figure 2:
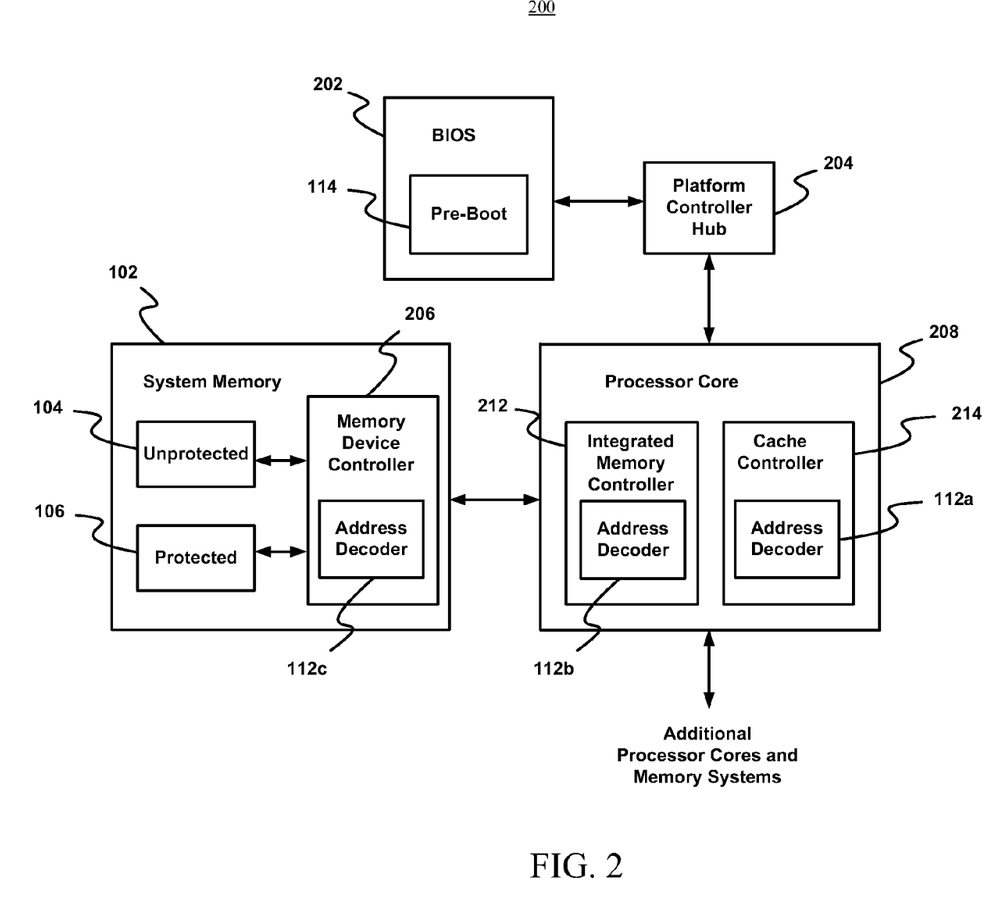
FIG. 2 illustrates a block diagram of one exemplary embodiment consistent with the present disclosure.

FIG. 2 illustrates a block diagram 200 showing additional detail of an exemplary embodiment consistent with the present disclosure. Processor 120, of FIG. 1, may be one of any number of a processor cores 208 each of which may comprise a processor cache memory controller 214 and/or an integrated memory controller 212. Processor 208 may communicate with one or more system memory modules 102 each of which may comprise a local memory device controller 206. Each of the memory controllers 214, 212 and 206 may further comprise an associated address decoding circuit 112a, 112b and 112c, respectively.

A trusted BIOS 202 may be coupled to processor core 208 through a platform controller hub 204. The trusted BIOS 202 may be configured to load ACPI tables 108 and other sensitive data to be secured 110 into protected region 106 of system memory 102 during pre-boot operations. The trusted BIOS 202 may be associated with a TCB that comprises verified hardware and software configured to provide a trusted execution environment. The trusted BIOS 202 may configure the protected region 106 to a read-only state and lock the region into that state by programming one or more of the address decoder circuits 112a, 112b and 112c. Address decoding circuit 112a may include a Source Address Decoding (SAD) register provided for memory access configuration programming. Address decoding circuit 112b may include a Target Address Decoding (TAD) register provided for memory access configuration programming. The protected region may remain locked until a subsequent system reset, power cycle or wake-up from an ACPI system sleep state 3. Subsequent attempts to perform memory write operations on the protected region may be dropped (e.g., fail) and may be reported as a memory write-fault error if the system is configured to report such events.

In some embodiments, the system memory 102 may be dynamic random access memory (DRAM) including phase change memory and switch (PCMS) circuitry.

Figure 3:
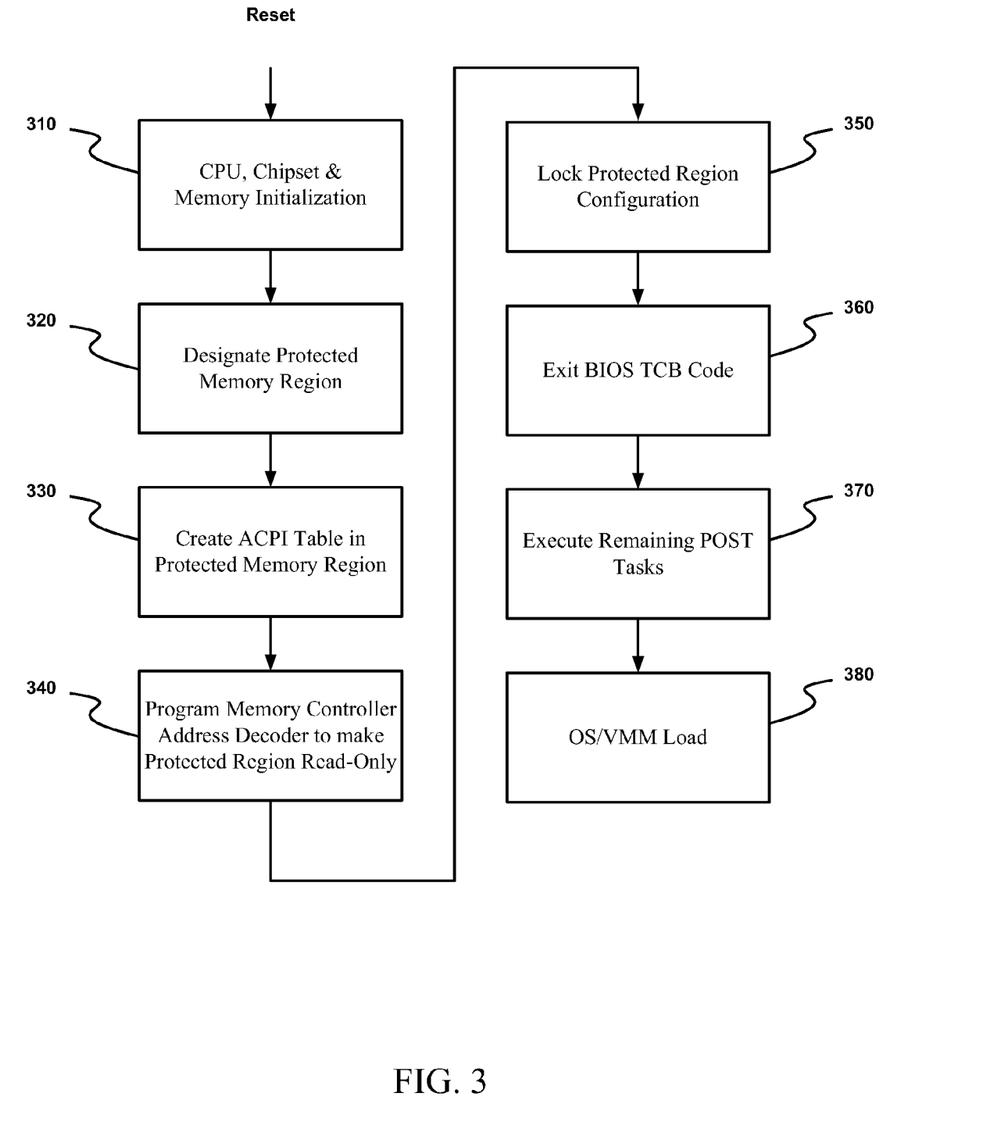
FIG. 3 illustrates a flowchart of operations of an exemplary embodiment consistent with the present disclosure.

FIG. 3 illustrates a flowchart of operations 300 of an exemplary embodiment consistent with the present disclosure. Operation 310 may occur at system reset or on power up, for example as part of the power on self test (POST) or other pre-boot operations. Operations 310 through 360, as described below, may be performed by trusted BIOS code. At operation 310 the CPU, chipset and memory are initialized. At operation 320, a protected region of system memory is designated. At operation 330, the ACPI table is created or moved into the protected region of system memory. Other sensitive or secure data, tables, interfaces or code segments may also be moved into the protected region. At operation 340, the memory controller address decoder is programmed to configure the protected region as read-only. At operation 350, the protected region configuration is locked in the read-only state. At operation 360, the trusted BIOS code may exit TCB mode. At operation 370, any remaining POST tasks are executed. At operation 380, the OS and/or MVMM are loaded into system memory and started. In some embodiments the OS/MVMM may continue to use the ACPI tables from the protected memory region or the OS/MVMM may copy the ACPI tables to a kernel (e.g., ring0) protected memory region.

Figure 4:
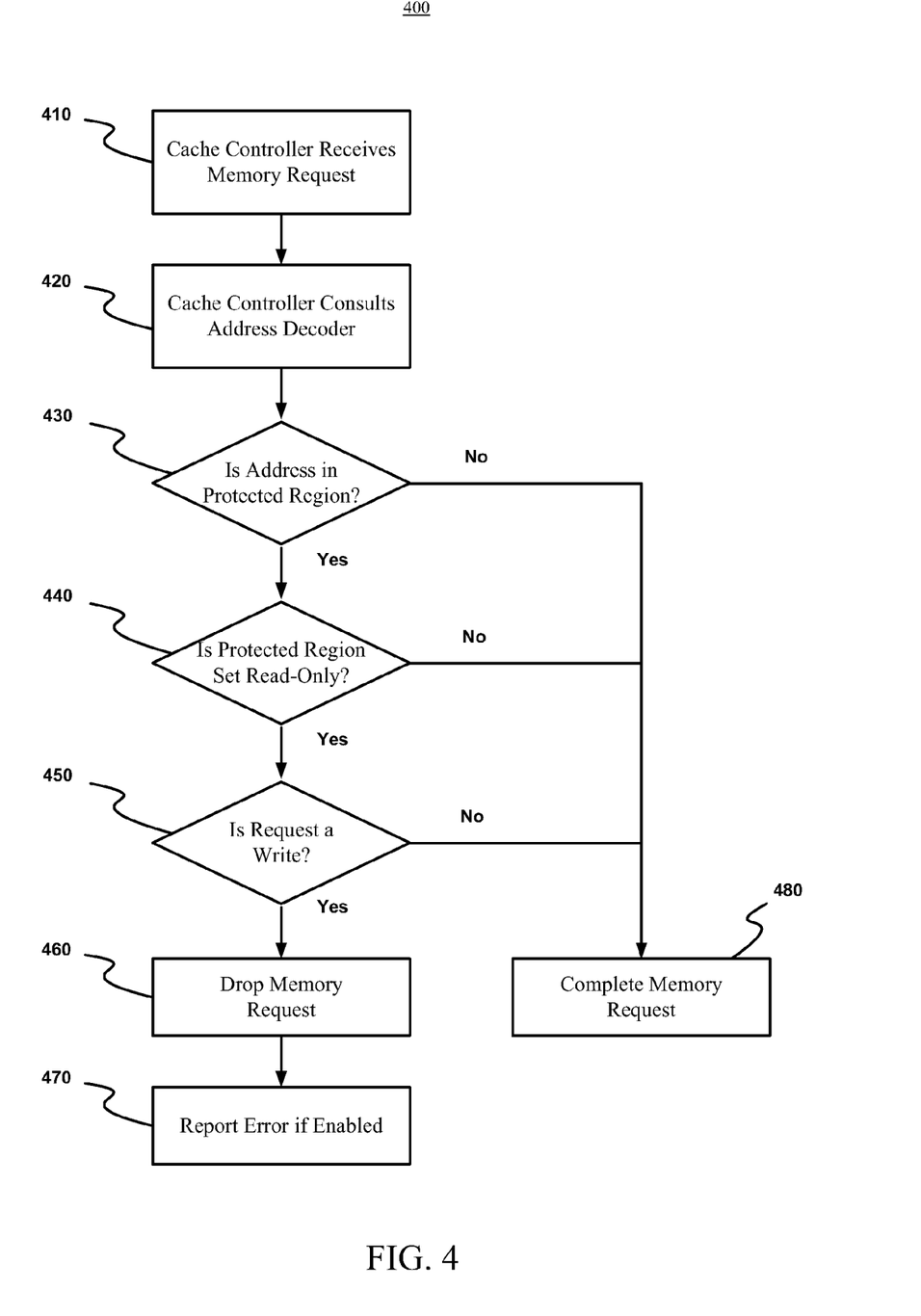
FIG. 4 illustrates a flowchart of operations of another exemplary embodiment consistent with the present disclosure.

FIG. 4 illustrates a flowchart of operations 400 of another exemplary embodiment consistent with the present disclosure. Operations 410 through 480 may occur after the trusted BIOS code has completed the pre-boot operations described above. At operation 410, the cache memory controller receives a memory access request. At operation 420, the cache memory controller consults the address decoder. At operation 430, if the requested address is not in the protected region, control transfers to operation 480. At operation 440, if the protected region is not set to read-only, control transfers to operation 480. At operation 450, if the memory access request is not a write access, control transfers to operation 480, otherwise, at operation 460, the memory request is dropped and, at operation 470, an error is reported if reporting is enabled. At operation 480, the memory request is completed.

Figure 5:
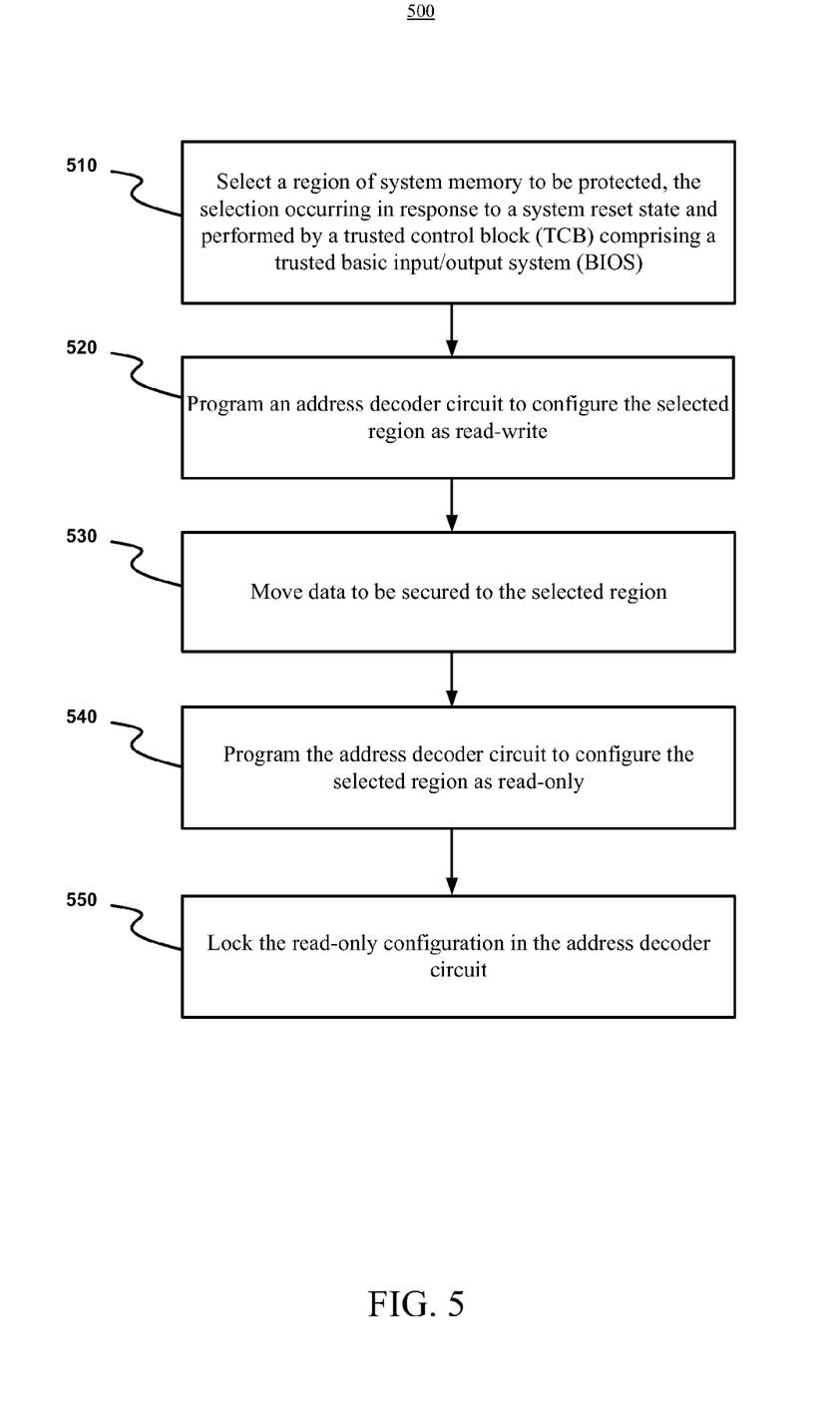
FIG. 5 illustrates a flowchart of operations of another exemplary embodiment consistent with the present disclosure.

FIG. 5 illustrates a flowchart of operations 500 of another exemplary embodiment consistent with the present disclosure. At operation 510, a region of system memory is selected to be protected. The selection occurs in response to a system reset state and is performed by a trusted control block (TCB) which includes a trusted basic input/output system (BIOS). At operation 520, an address decoder circuit is programmed to configure the selected region as read-write. At operation 530, the data to be secured is moved to the selected region. At operation 540, the address decoder circuit is programmed to configure the selected region as read-only. At operation 550, the read-only configuration in the address decoder circuit is locked.

While FIGS. 3, 4 and 5 illustrate various operations according to different embodiments, it is to be understood that not all of the operations depicted in FIGS. 3-5 are necessary for other embodiments. Indeed, it is fully contemplated herein that in other embodiments of the present disclosure, the operations depicted in FIGS. 3-5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, phase change memory (PCM), phase change memory with switch (PCMS) or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

An app may be embodied as code or instructions which may be executed on programmable circuitry such as a host processor or other programmable circuitry.

Thus, the present disclosure provides methods and systems for secure data protection with improved read-only memory locking during system pre-boot including protection of Advanced Configuration and Power Interface (ACPI) tables.

According to one aspect there is provided a method. The method may include selecting a region of system memory to be protected, the selection occurring in response to a system reset state, the selection performed by a TCB including a trusted BIOS. The method of this example may also include programming an address decoder circuit to configure the selected region as read-write. The method of this example may further include moving data to be secured to the selected region. The method of this example may further include programming the address decoder circuit to configure the selected region as read-only. The method of this example may further include locking the read-only configuration in the address decoder circuit.

Another example method includes the forgoing operations and the system reset state further includes a system power up.

Another example method includes the forgoing operations and the data to be secured includes an ACPI table.

Another example method includes the forgoing operations and further includes performing remaining system boot-up tasks after the locking.

Another example method includes the forgoing operations and the remaining system boot-up tasks include loading an OS.

Another example method includes the forgoing operations and the address decoder circuit is programmed through an SAD register associated with a processor cache memory controller.

Another example method includes the forgoing operations and the address decoder circuit is programmed through a TAD register associated with an integrated processor memory controller.

Another example method includes the forgoing operations and the address decoder circuit is associated with a DRAM device controller.

Another example method includes the forgoing operations and further includes rejecting a memory write request to the selected region after the locking is performed.

Another example method includes the forgoing operations and further includes reporting a memory write fault error in response to the memory write request rejection.

According to one aspect there is provided a system. The system may include a system memory, an address decoder circuit coupled to the system memory and a processor coupled to the address decoder circuit. The system of this example may also include a TCB associated with the processor, and the TCB is configured to execute a trusted BIOS. The trusted BIOS of this example may also be configured to move data to be secured to a selected region of the system memory in response to a system reset state, program the address decoder circuit to configure the selected region as read-only and lock the read-only configuration in the address decoder circuit.

Another example system includes the forgoing components and the system reset state further includes a system power up.

Another example system includes the forgoing components and the data to be secured includes an ACPI table.

Another example system includes the forgoing components and further includes a processor cache memory controller and the address decoder circuit is programmed through an SAD register associated with the processor cache memory controller.

Another example system includes the forgoing components and further includes an integrated processor memory controller and the address decoder circuit is programmed through a TAD register associated with the integrated processor memory controller.

Another example system includes the forgoing components and further includes a DRAM device controller and the address decoder circuit is associated with the DRAM device controller.

According to another aspect there is provided at least one computer-readable storage medium having instructions stored thereon which when executed by a processor, cause the processor to perform the methods as described in the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method for secure data protection, said method comprising:
   selecting a region of system memory to be protected, said selection occurring in response to a system reset state, said selection performed by a trusted control block (TCB) comprising a trusted basic input/output system (BIOS);
   programming an address decoder circuit to configure said selected region as read-write;
   moving data to be secured to said selected region;
   programming, through a source address decoder (SAD) register associated with a processor cache memory controller or a target address decoder (TAD) register associated with an integrated processor memory controller, said address decoder circuit to configure said selected region as read-only; and
   locking said read-only configuration in said address decoder circuit.

2. The method of claim 1, wherein said system reset state further comprises a system power up.

3. The method of claim 1, wherein said data to be secured comprises an Advanced Configuration and Power Interface (ACPI) table.

4. The method of claim 1, further comprising performing remaining system boot-up tasks after said locking.

5. The method of claim 4, wherein said remaining system boot-up tasks comprise loading an operating system (OS).

6. The method of claim 1, wherein said address decoder circuit is associated with a dynamic random access memory (DRAM) device controller.

7. The method of claim 1, further comprising rejecting a memory write request to said selected region after said locking is performed.

8. The method of claim 7, further comprising reporting a memory write fault error in response to said memory write request rejection.

9. A system for secure data protection, said system comprising:
   a system memory;
   an address decoder circuit coupled to said system memory;
   a processor coupled to said address decoder circuit;
   a processor cache memory controller;
   an integrated processor memory controller; and
   a trusted control block (TCB) associated with said processor, said TCB configured to execute a trusted basic input/output system (BIOS), wherein said trusted BIOS is configured to:
   move data to be secured to a selected region of said system memory in response to a system reset state;
   program said address decoder circuit through a source address decoder (SAD) register associated with the processor cache memory controller or a target address decoder (TAD) register associated with the integrated processor memory controller to configure said selected region as read-only; and
   lock said read-only configuration in said address decoder circuit.

10. The system of claim 9, wherein said system reset state further comprises a system power up.

11. The system of claim 9, wherein said data to be secured comprises an Advanced Configuration and Power Interface (ACPI) table.

12. The system of claim 9, further comprising a dynamic random access memory (DRAM) device controller wherein said address decoder circuit is associated with said dynamic random access memory (DRAM) device controller.

13. A non-transitory computer-readable storage medium having instructions stored thereon which when executed by a processor result in the following operations for secure data protection, said operations comprising:

selecting a region of system memory to be protected, said selection occurring in response to a system reset state, said selection performed by a trusted control block (TCB) comprising a trusted basic input/output system (BIOS);

programming an address decoder circuit through a source address decoder (SAD) register associated with a processor cache memory controller or a target address decoder (TAD) register associated with an integrated processor memory controller to configure said selected region as read-write;

moving data to be secured to said selected region;

programming said address decoder circuit to configure said selected region as read-only; and locking said read-only configuration in said address decoder circuit.

14. The non-transitory computer-readable storage medium of claim 13, wherein said system reset state further comprises a system power up.

15. The non-transitory computer-readable storage medium of claim 13, wherein said data to be secured comprises an Advanced Configuration and Power Interface (ACPI) table.

16. The non-transitory computer-readable storage medium of claim 13, further comprising the operation of performing remaining system boot-up tasks after said locking.

17. The non-transitory computer-readable storage medium of claim 16, wherein said remaining system boot-up tasks comprise loading an operating system (OS).

18. The non-transitory computer-readable storage medium of claim 13, wherein said address decoder circuit is associated with a dynamic random access memory (DRAM) device controller.

19. The non-transitory computer-readable storage medium of claim 13, further comprising the operation of rejecting a memory write request to said selected region after said locking is performed.

20. The non-transitory computer-readable storage medium of claim 19, further comprising the operation of reporting a memory write fault error in response to said memory write request rejection.

* * * * *